May 27, 1924.
W. C. SWIFT
BRAKE LINING
Filed April 13, 1921
1,495,721
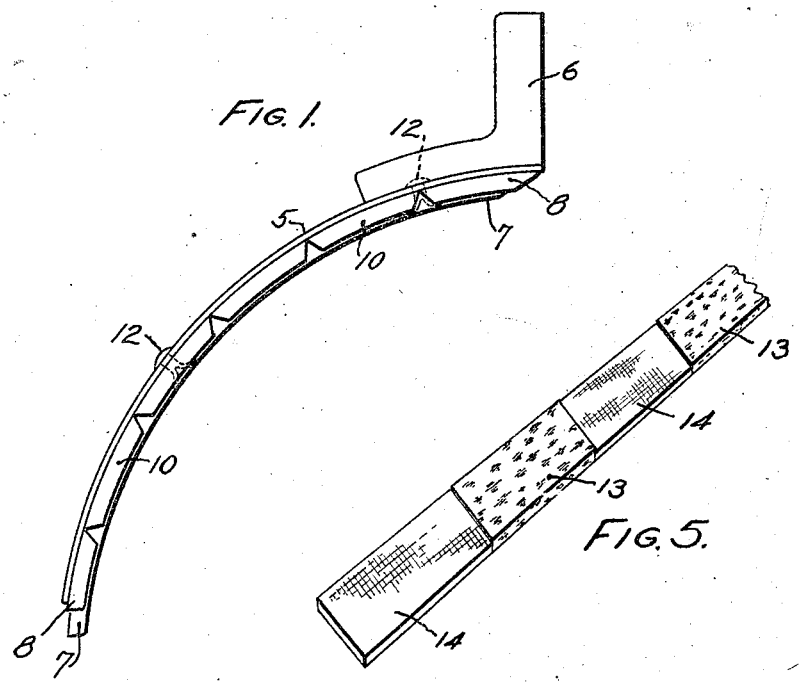
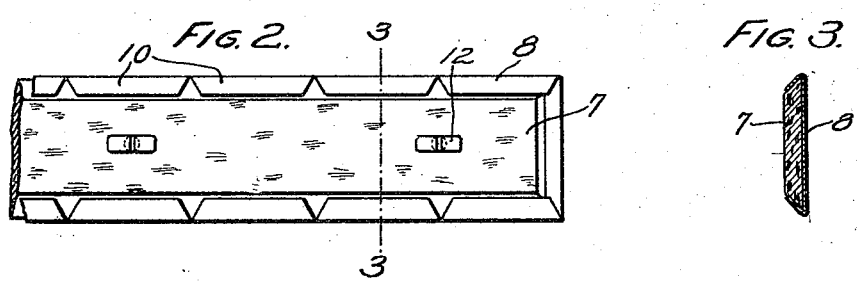
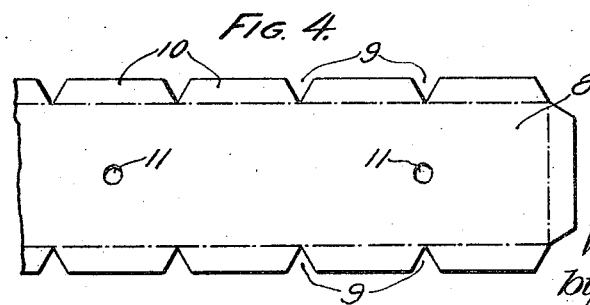
Inventor:
William C. Swift
by Rowell F. Hatch
Atty.

Patented May 27, 1924.

1,495,721

UNITED STATES PATENT OFFICE.

WILLIAM C. SWIFT, OF CAMBRIDGE, MASSACHUSETTS.

BRAKE LINING.

Application filed April 13, 1921. Serial No. 460,919.

*To all whom it may concern:*

Be it known that I, WILLIAM C. SWIFT, a citizen of the United States, residing at Cambridge, in the county of Middlesex and the Commonwealth of Massachusetts, have invented certain new and useful Improvements in Brake Linings, of which the following is a specification.

This invention relates to frictional material of the character usually comprehended within the meaning of the term "brake linings" which is to be understood to include transmission linings and other analogous devices. The invention is particularly adapted for use in automobiles although it may be applied to various other uses.

The object of the invention is to provide a brake lining which will be easily applied, slow to wear, and which will always grip the co-operating brake member with a firm but yielding grip in order to prevent "chattering" during the slippage when the brake is first applied.

The advantage of cork in a brake lining has long been recognized and it has been employed in connection with farbric, as inserts and as a lining stitched or otherwise secured thereto. These constructions have been objectionable, to some extent, on account of the inserts weakening the fabric and becoming loose, and for the reason that the stitches or other fasteners weakened the cork so that it soon broke up. The present invention contemplates the provision of a brake lining having its wearing element permanently secured in a carrier, preferably of metal, which assists in securing the frictional material to the brake band by the same means employed with a fabric lining. The frictional element of the lining may be of natural cork or an artificial cork composition, which may compose the entire element or it may comprise alternate sections of cork and fabric, the purpose of the fabric being to limit the amount the cork can be compressed.

The various features employed to the accomplishment of this object and such others as hereinafter appear, will best be understood from the following description read in connection with the accompanying drawings of one embodiment of the invention, in which :—

Fig. 1 is a side elevation of a part of a Ford transmission band with the lining attached:

Fig. 2 is a plan view of the lining removed from the band:

Fig. 3 is a section thru the lining, taken on the line 3—3 of Fig. 2:

Fig. 4 is a plan of an end of the carrier before bending: and

Fig. 5 is a perspective view showing one form of the frictional element of the lining.

There is illustrated in Fig. 1, one end of a Ford transmission or brake band, comprising a sheet steel band 5 and a lug 6 by which the band may be closed upon the drum (not shown). The lining comprises a frictional strip 7 and a carrier 8 in which the strip is clamped. The carrier is preferably made of sheet brass cut to a size slightly wider and longer than the strip which is clamped therein by bending the marginal portions over onto the strip. The strip 7 may, if desired, be provided with bevelled edges to be embraced by the margin of the carrier when bent inwardly at an acute angle as shown in Fig. 3.

In order to increase the flexibility of the lining, the longitudinal edges of the carrier 8 may be provided with V-notches 9, having their apices coincident with the bend to be formed, the position of which is indicated by the dot-and-dash lines in Fig. 4. This provides a series of tongues 10 which are bent over on the edge of the strip 8 and provide a substantially continuous gripping action while permitting free flexure to the necessary extent.

The assembled lining is secured to the band 5 in the same manner as the usual fabric lining and therefore the services of a skilled mechanic are not required for installation. The carrier 8 is preferably provided with a series of holes 11 corresponding to the holes found in the band 5, for the receipt of split rivets 12 by which both the carrier and the frictional strip are firmly secured to the band.

The frictional strip 7 may be of a uniform composition thruout, such for example as natural cork or a molded composition containing cork or other frictional material. It is preferred, however, to employ a frictional strip built up from alternate sections of cork or similar material 13 and fabric 14 as shown in Fig. 5. The cork sections are slightly thicker than the fabric and when the band is tightened upon the drum, the cork compresses to the thickness of the fabric after which a greatly increased resistance to compression occurs. All of the sections are securely held in the carrier by the bent marginal portions or tongues 10.

The particular construction described, provides a brake lining applicable to Ford cars without any change in the standard parts. One advantage of this device over linings in which the fabric forms a carrying member for the cork, is that a much greater area of imperforate cork may be presented to the drum, even to the extent of a continuous surface as shown in Figs. 1 and 2, with a corresponding improvement in its gripping action. Other advantages are that the strip may be worn nearly thru without lessening the efficiency of the lining to any appreciable extent, and furthermore, no portion of the lining, such as inserts, can become loose, as the entire strip, whether unitary or sectional, is securely held to the backing or carrier, and both are secured to the band by the rivets.

It is to be understood that the invention is capable of modification by substitution of materials and changes in the form and arrangements of the parts without departing from the scope of the invention as defined in the following claims.

What is claimed, is:—

1. A brake lining comprising a strip of frictional material and a flexible metallic carrier clamping the marginal portion of the strip.

2. A brake lining comprising a strip of frictional material and a metallic carrier forming a backing for the strip and having its edges bent over to clamp edges of the strip to the backing, said carrier being flexible lengthwise of the bent edges.

3. A brake lining comprising a strip of frictional material extending circumferentially of the brake, a continuous metallic backing therefor, and a series of tongues projecting from the backing and bent over the edges of the strip to hold it thereto.

4. A brake band lining comprising a strip of frictional material of an area substantially equal to the band and having a bevelled surface on its edges, a smooth metal plate covering the back of the strip, and tongues formed integral with said plate and bent inwardly to engage the bevelled surfaces and hold the strip to the plate.

5. A brake element having in combination, a strip comprising alternate sections of cork and fabric, a sheet metal carrier covering one side of the strip and having its edges bent back upon itself to engage the edges of the sections composing the strip.

6. A lining for a circular brake band, comprising a continuous metallic carrier extending circumferentially of the band and provided with a series of cuts to increase its flexibility, and a strip of frictional material secured to the carrier by bending the edges of the carrier to grip the strip.

7. A brake element comprising a strip of frictional material, and a backing therefor having its edge bent to clamp said material thereto and arranged to flex longitudinally of said bent edge.

8. A brake element adapted to cooperate with a circular brake drum, comprising frictional material, and a carrier having bent edges to embrace said material, the bent edges being arranged to extend circumferentially of the drum.

9. A brake element comprising alternate sections of different frictional material, and a single carrier having its edges bent to secure the different sections of material thereto.

In testimony whereof I have hereunto affixed my signature.

WILLIAM C. SWIFT.